United States Patent
Xia et al.

(10) Patent No.: US 11,811,482 B2
(45) Date of Patent: Nov. 7, 2023

(54) SIDELINK BEAM ACQUISITION WITH BASE STATION ASSISTANCE

(71) Applicant: Huawei Technologies Co., Ltd., Shenzhen (CN)

(72) Inventors: Pengfei Xia, San Diego, CA (US); Bin Liu, San Diego, CA (US); Young Hoon Kwon, Seongnam-si (KR)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/799,787

(22) PCT Filed: Mar. 13, 2020

(86) PCT No.: PCT/US2020/022604
§ 371 (c)(1),
(2) Date: Aug. 15, 2022

(87) PCT Pub. No.: WO2020/190708
PCT Pub. Date: Sep. 24, 2020

(65) Prior Publication Data
US 2023/0101442 A1  Mar. 30, 2023

(51) Int. Cl.
*H04B 7/08* (2006.01)
*H04L 5/00* (2006.01)
*G01S 5/02* (2010.01)

(52) U.S. Cl.
CPC ............ *H04B 7/086* (2013.01); *G01S 5/0284* (2013.01); *H04B 7/0857* (2013.01); *H04L 5/0051* (2013.01)

(58) Field of Classification Search
CPC ..... H04B 7/086; H04B 7/0857; G01S 5/0284; H04L 5/0051
See application file for complete search history.

(56) References Cited

U.S. PATENT DOCUMENTS

| | | |
|---|---|---|
| 2016/0095080 A1 | 3/2016 | Khoryaev et al. |
| 2017/0034802 A1 | 2/2017 | Vitek et al. |
| 2018/0123751 A1 | 5/2018 | Narasimha et al. |
| 2019/0045569 A1 | 2/2019 | Abedini et al. |
| 2019/0260455 A1 | 8/2019 | Ryu et al. |

(Continued)

FOREIGN PATENT DOCUMENTS

WO  2020047024 A1  3/2020

OTHER PUBLICATIONS

Brahmi et al., "Deliverable D3.1 Intermediate 5G V2X Radio", Version: v1.0, Fifth Generation Communication Automotive Research and Innovation, May 31, 2018, 121 Pages.

*Primary Examiner* — Jaison Joseph
(74) *Attorney, Agent, or Firm* — Slater Matsil, LLP

(57) ABSTRACT

A method for sidelink beam acquisition for device to device (D2D) communication includes calculating, by a base station, one or more first directions, where the one or more first directions are directions of a second electronic device located relative to a first electronic device; calculating, by the base station, one or more second directions, where the one or more second directions are directions of the first electronic device located relative to the second electronic device; transmitting, by the base station and to the first electronic device, the one or more first directions; and transmitting, by the base station and to the second electronic device, the one or more second directions.

24 Claims, 6 Drawing Sheets

(56) References Cited

U.S. PATENT DOCUMENTS

| | | | |
|---|---|---|---|
| 2021/0028832 A1* | 1/2021 | Liu | H04W 16/28 |
| 2023/0057661 A1* | 2/2023 | Awoniyi-Oteri | H04B 7/063 |
| 2023/0101442 A1* | 3/2023 | Xia | H04B 7/0857 |
| | | | 375/346 |
| 2023/0129257 A1* | 4/2023 | Xia | H04W 24/10 |
| | | | 370/329 |

* cited by examiner

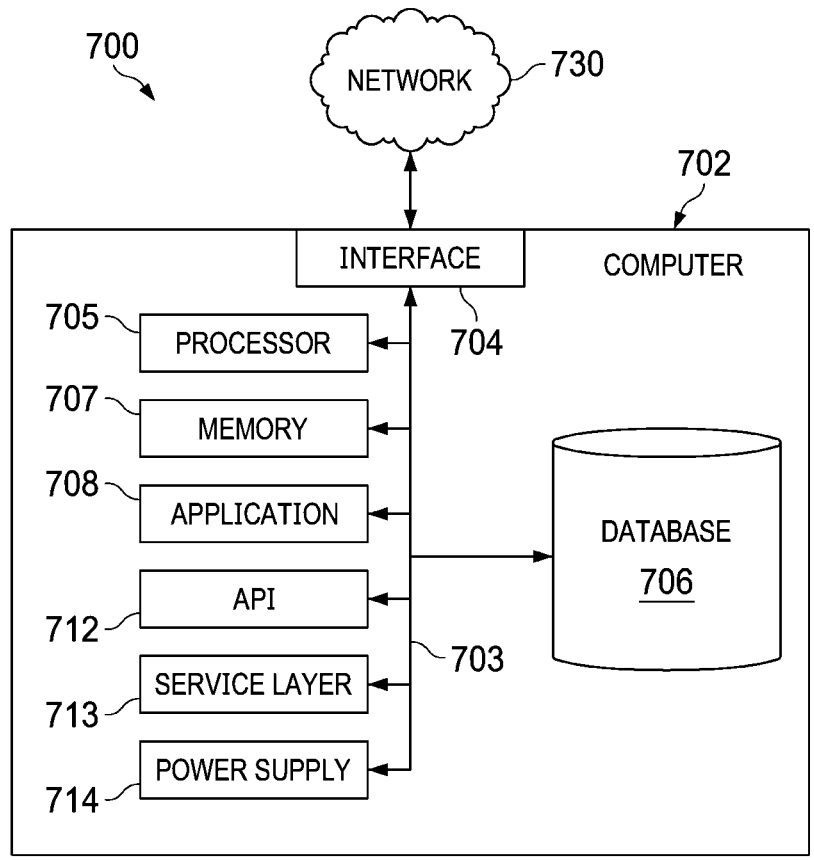
FIG. 7
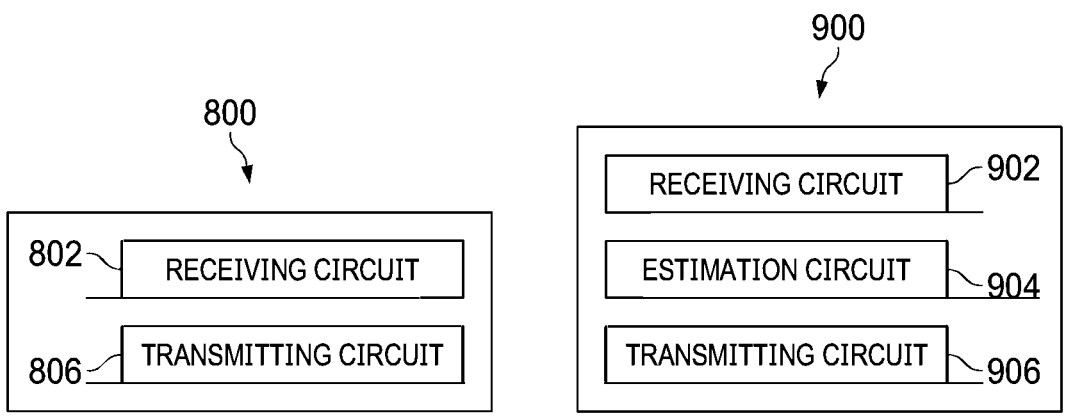
FIG. 8
FIG. 9

SIDELINK BEAM ACQUISITION WITH BASE STATION ASSISTANCE

CROSS-REFERENCE TO RELATED APPLICATIONS

This application is a National Stage of International Application No. PCT/US2020/022604, filed on Mar. 13, 2020, titled "Sidelink Beam Acquisition with Base Station Assistance," application of which is incorporated herein by reference in its entirety.

TECHNICAL FIELD

This disclosure relates to sidelink beam acquisition, particularly for beam acquisition with base station assistance in 3rd Generation Partnership Project (3GPP) New Radio (NR) systems to support sidelink beam management.

BACKGROUND

In 3GPP NR systems, downlink beam management and uplink beam management are supported. A downlink refers to a link from a base station to a device. An uplink refers to a link from a device to a base station.

SUMMARY

The present disclosure describes sidelink beam acquisition with base station assistance for device to device (D2D) communication.

In a first implementation, a method includes: calculating, by a base station, one or more first directions, where the one or more first directions are directions of a second electronic device located relative to a first electronic device; calculating, by the base station, one or more second directions, where the one or more second directions are directions of the first electronic device located relative to the second electronic device; transmitting, by the base station and to the first electronic device, the one or more first directions; and transmitting, by the base station and to the second electronic device, the one or more second directions.

In a second implementation, an electronic device includes: a non-transitory memory storage comprising instructions; and one or more hardware processors in communication with the memory storage, where the one or more hardware processors execute the instructions to perform operations comprising: calculating one or more first directions, where the one or more first directions are directions of a second electronic device located relative to a first electronic device; calculating one or more second directions, where the one or more second directions are directions of the first electronic device located relative to the second electronic device; transmitting, to the first electronic device, the one or more first directions; and transmitting, to the second electronic device, the one or more second directions.

In a third implementation, a non-transitory computer-readable medium storing computer instructions for transmission beam control in a data communication, that when executed by one or more hardware processors, cause the one or more hardware processors to perform operations including: calculating, by a base station, one or more first directions, where the one or more first directions are directions of a second electronic device located relative to a first electronic device; calculating, by the base station, one or more second directions, where the one or more second directions are directions of the first electronic device located relative to the second electronic device; transmitting, by the base station and to the first electronic device, the one or more first directions; and transmitting, by the base station and to the second electronic device, the one or more second directions.

The previously described implementation is implementable using a method; a non-transitory, computer-readable medium storing computer-readable instructions to perform the method; and a computer-implemented system comprising a computer memory interoperably coupled with a hardware processor configured to perform the method and the instructions stored on the non-transitory, computer-readable medium.

The details of one or more implementations of the subject matter of this specification are set forth in the accompanying drawings and the description. Other features, aspects, and advantages of the subject matter will become apparent from the description, the drawings, and the claims.

BRIEF DESCRIPTION OF THE DRAWINGS

FIG. 7 is a block diagram of an example computer system used to provide computational functionalities associated with described algorithms, methods, functions, processes, flows, and procedures, as described in the instant disclosure, according to an implementation.

FIG. 8 is a schematic diagram illustrating an example structure of a terminal described in the present disclosure, according to an implementation.

FIG. 9 is a schematic diagram illustrating an example structure of a base station described in the present disclosure, according to an implementation.

Like reference numbers and designations in the various drawings indicate like elements.

DETAILED DESCRIPTION OF ILLUSTRATIVE EMBODIMENTS

Figure 1:
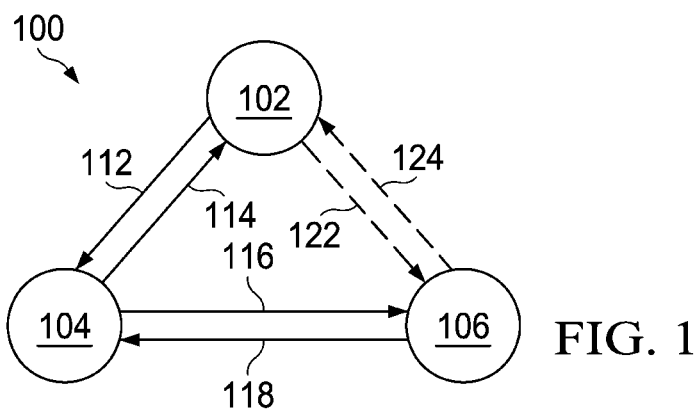
FIG. 1 is a block diagram illustrating sidelink beam acquisition for device to device (D2D) communication, according to an implementation.

The following detailed description describes sidelink beam acquisition with base station assistance for device to device (D2D) communication and is presented to enable any person skilled in the art to make and use the disclosed subject matter in the context of one or more particular implementations.

Various modifications, alterations, and permutations of the disclosed implementations can be made and will be readily apparent to those of ordinary skill in the art, and the general principles defined may be applied to other implementations and applications, without departing from the scope of the disclosure. In some instances, details unnecessary to obtain an understanding of the described subject matter may be omitted so as to not obscure one or more described implementations with unnecessary detail inasmuch as such details are within the skill of one of ordinary skill in the art. The present disclosure is not intended to be limited to the described or illustrated implementations, but to be accorded the widest scope consistent with the described principles and features.

The 3rd Generation Partnership Project (3GPP) New Radio (NR) systems can support downlink beam management and uplink beam management. A downlink refers to a link from a base station to a device. An uplink refers to a link from a device to a base station. However, sidelink beam management (e.g., sidelink in millimeter wave frequency) is not supported in the current 3GPP NR systems. A sidelink can be defined for direct D2D communication without going through a base station (such as a 5G base station (gNB)).

The present disclosure describes example implementations of wireless signal transmission and reception for D2D communication (e.g., in mmWave frequency bands). In the present disclosure, a base station with multiple antenna arrays can estimate relative directions between a first electronic device and a second electronic device and transmit the estimated relative directions to the first electronic device, the second electronic device, or both the first and second electronic devices. The estimated relative directions can be used to assist sidelink beam management between the first electronic device and the second electronic device.

The subject matter described in the present disclosure can be implemented in particular implementations so as to realize one or more of the following advantages. First, the described approach can reduce sidelink beam management overhead. For example, with base station assistance and before performing sidelink beam management, a first electronic device can know in which direction a second electronic device is located relative to the first electronic device. The first electronic device can acquire, based on the direction information, a beam pattern to be used for sidelink communication with the second electronic device. Second, with multiple antenna arrays, a base station can estimate locations of the first electronic device and the second electronic device more accurately, thereby providing more accurate direction information for sidelink beam management between the first electronic device and the second electronic device. Other advantages will be apparent to those of ordinary skill in the art.

FIG. 1 is a block diagram 100 illustrating sidelink beam acquisition for device to device (D2D) communication, according to an implementation. The block diagram 100 includes a base station 102, user equipment (UE) 104, and UE 106. For example, the base station 102 can communicate with UE 104 through downlink 112 and uplink 114. UE 104 can communicate with UE 106 through forward sidelink 116 and reverse sidelink 118. If UE 106 is under coverage of the base station 102, the base station 102 can communicate with UE 106 through downlink 122 and uplink 124. In some implementations, additional, different, or fewer UEs can be included in the block diagram 100.

As illustrated in FIG. 1, sidelink mode 1 is considered. In sidelink mode 1, a transmitting UE (TxUE), such as the UE 104, is under coverage of the base station 102. A receiving UE (RxUE), such as the UE 106, may or may not be under coverage of the base station 102. In some implementations, other sidelink modes can be considered in FIG. 1.

Figure 2:
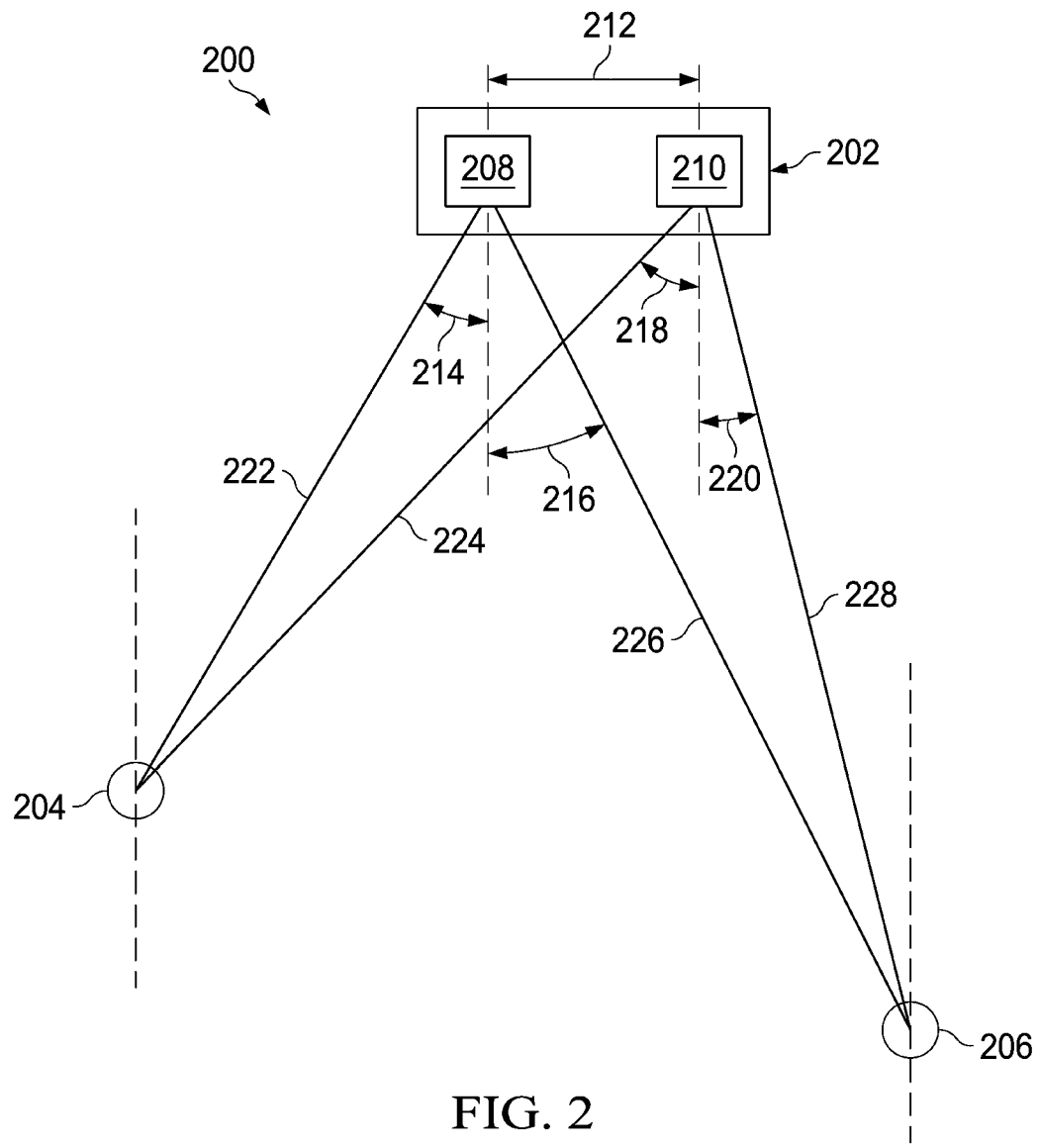
FIG. 2 is a diagram illustrating signals received at a base station with two antenna arrays, according to an implementation.

FIG. 2 is a diagram 200 illustrating signals received at a base station with two antenna arrays, according to an implementation. The diagram 200 includes a base station 202, a TxUE 204, and an RxUE 206. The base station 202 includes a first antenna array 208 and a second antenna array 210. In some implementations, additional, different, or fewer antenna arrays can be included in the diagram 200.

As illustrated in FIG. 2, there is a distance 212 between the first antenna array 208 and the second antenna array 210. The distance 212 can be known to the base station 202. Both the TxUE 204 and the RxUE 206 are under coverage of the base station 202. In some implementations, the base station 202 can be a smart TV, and the TxUE 204 and the RxUE 206 can be smart devices with mmWave beamforming capability. To simplify the discussion, the following process will be described assuming that a near field approximation is used.

In some implementations, it is desirable for the base station 202 to assist sidelink beam management between the TxUE 204 and the RxUE 206. For example, the base station 202 can estimate locations of the TxUE 204 and the RxUE 206 based on signals received from the TxUE 204 and the RxUE 206, respectively. With the estimated locations, the base station 202 can determine a direction of the RxUE 206 relative to the TxUE 204 and a direction of the TxUE 204 relative to the RxUE 206. The base station 202 can transmit the direction information (such as a reference direction information combined with an angular information) to the TxUE 204 and the RxUE 206. The TxUE 204 can acquire, based on the direction information, a beam pattern to be used for sidelink communication with the RxUE 206. The RxUE 206 can acquire, based on the direction information, a beam pattern to be used for sidelink communication with the TxUE 204.

Based on signals received from the TxUE 204, the base station 202 can calculate (or estimate) angle of arrivals and path lengths from the TxUE 204 to each of the first antenna array 208 and the second antenna array 210. For example, the base station 202 can calculate $\alpha_t$ 214 (angle of arrival from the TxUE 204 to the first antenna array 208), $\beta_t$ 218 (angle of arrival from the TxUE 204 to the second antenna array 210), $L_t$ 222 (path length from the TxUE 204 to the first antenna array 208), and $R_t$ 224 (path length from the TxUE 204 to the second antenna array 210).

Based on signals received from the RxUE 206, the base station 202 can calculate (or estimate) angle of arrivals and path lengths from the RxUE 206 to each of the first antenna array 208 and the second antenna array 210. For example, the base station 202 can calculate $\alpha_r$ 216 (angle of arrival from the RxUE 206 to the first antenna array 208), $\beta_r$ 220 (angle of arrival from the RxUE 206 to the second antenna array 210), $L_r$ 226 (path length from the RxUE 206 to the first antenna array 208), and $R_r$ 228 (path length from the RxUE 206 to the second antenna array 210).

Each of the TxUE 204, the RxUE 206, the first antenna array 208, and the second antenna array 210 can have its own reference direction. In some implementations, reference directions of the TxUE 204, the RxUE 206, the first antenna array 208, and the second antenna array 210 can be different. In such cases, the TxUE 204, the RxUE 206, the first antenna array 208, and the second antenna array 210 can transmit their reference directions to a common device (such as the base station 202) where information is processed to reach a sidelink beam management recommendation. To simplify the discussion, the following process will be described assuming that a common reference direction (CRD) is used. For example, a geomagnetic direction such as the absolute north direction can serve as the CRD in the azimuth domain.

In some implementations, each of the TxUE 204, the RxUE 206, the first antenna array 208, and the second antenna array 210 can be considered to be located at a single point. For example, the first antenna array 208 can be represented by the center point of the first antenna array 208. The second antenna array 210 can be represented by the center point of the second antenna array 210. The TxUE 204 can be represented by the center point of the TxUE 204. The RxUE 206 can be represented by the center point of RxUE 206. In this way, the TxUE 204, the first antenna array 208, and the second antenna array 210 can form a triangle. The RxUE 206, the first antenna array 208, and the second antenna array 210 can form another triangle.

In some implementations, to estimate a path length (such as $L_t$ 222, $R_t$ 224, $L_r$ 226, and $R_r$ 228), a log-distance path loss model can be used. The log-distance path loss model can be expressed as:

$$PL_{LD}(d)[\text{dB}] = PL(d_0) + 10n\log\left(\frac{d}{d_0}\right)$$

$PL_{LD}$ is the total path loss measured in Decibel (dB). d is the path length. $PL(d_o)$ is the path loss at a reference distance $d_o$. n is the path loss exponent.

In some implementations, to estimate angle of arrivals (such as $\alpha_t$ 214, $\beta_t$ 218, $\alpha_r$ 216, and $\beta_r$ 220), the estimation of signal parameters via rotational invariant techniques (ESPRIT) or a multiple signal classification (MUSIC) algorithm can be used. In some implementations, other models, techniques, or algorithms can be used to estimate the path length or the angle of arrivals.

With the estimated path lengths and angle of arrivals, the base station 202 can calculate (or estimate) locations of the TxUE 204 and the RxUE 206. For example, the TxUE 204's location relative to the base station 202 can be estimated based on one or more of $\alpha_t$ 214, $\beta_t$ 218, $L_t$ 222, $R_t$ 224, and the distance 212. In some implementations, only $\alpha_t$ 214, $\beta_t$ 218, and the distance 212 are required, and $L_t$ 222 and $R_t$ 224 are optional in estimating the TxUE 204's location. However, using the optional $L_t$ 222 and $R_t$ 224 can improve the accuracy of the estimated TxUE 204's location. Similarly, the location can be estimated by only using other variables, such as only $\alpha_t$ and $L_t$, or $\beta_t$ and $R_t$, with additional measurements also improving accuracy of the estimate. In some implementations, other positioning methods (such as Global Positioning System (GPS) or other 3GPP based positioning methods) can be used by the base station 202.

Figure 3:
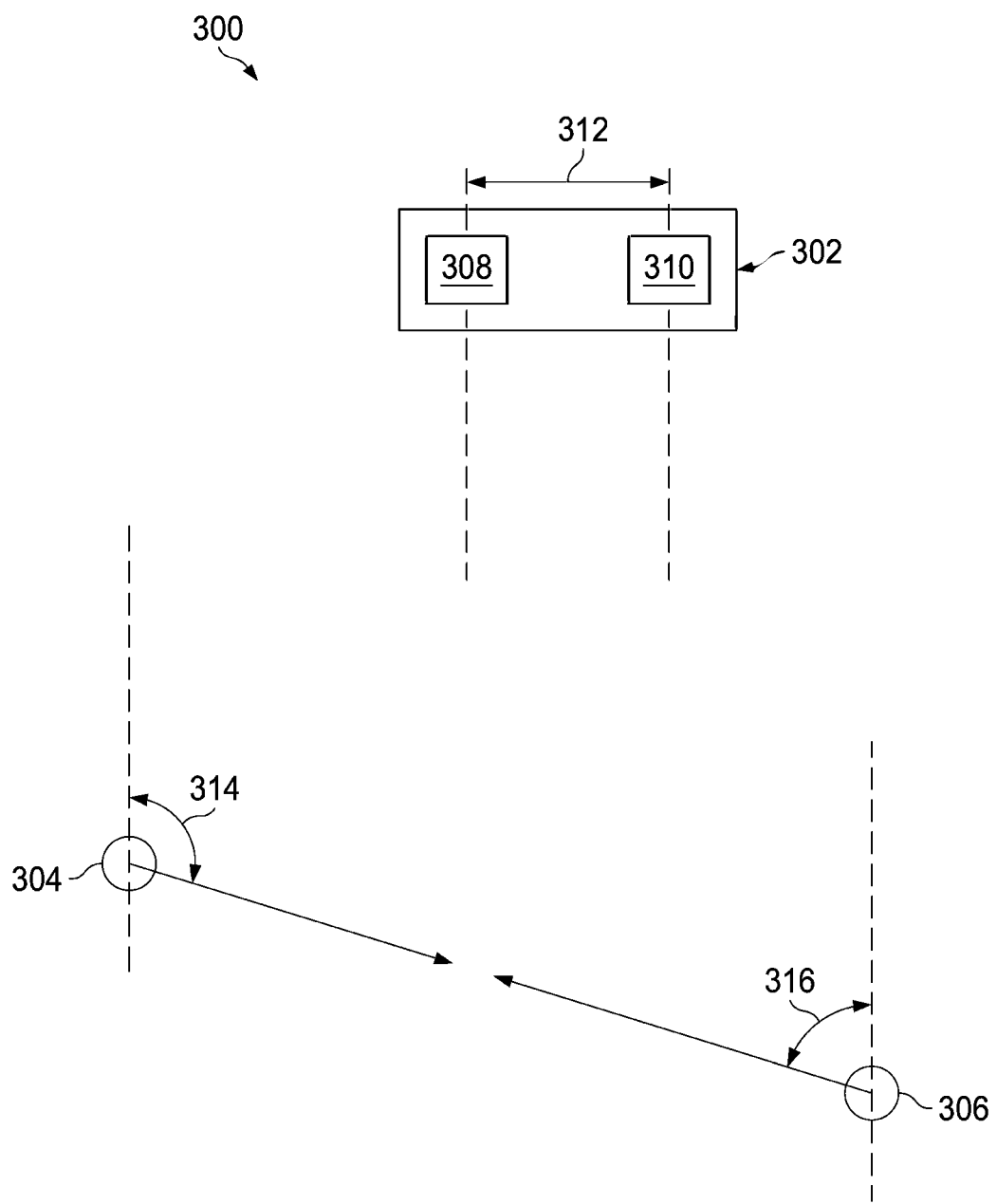
FIG. 3 is a diagram illustrating relative direction estimation between two devices, according to an implementation.

FIG. 3 is a diagram 300 illustrating relative direction estimation between two devices, according to an implementation. The diagram 300 includes a base station 302, a TxUE 304, and an RxUE 306. The base station 302 includes a first antenna array 308 and a second antenna array 310 that are separated by a distance 312. In some implementations, additional, different, or fewer antenna arrays can be included in the diagram 300.

As discussed in FIG. 2, the TxUE 304's location and the RxUE 306's location, relative to the base station 302, can be estimated. Using the estimated locations of the TxUE 304 and the RxUE 306, the base station 302 can estimate $\delta_r$ 314 (the direction of the RxUE 306 relative to the TxUE 304) and $\delta_t$ 316 (the direction of the TxUE 304 relative to the RxUE 306). The base station 302 can transmit the estimated $\delta_r$ 314 and $\delta_t$ 316 to the TxUE 304 and the RxUE 306, respectively. The estimated $\delta_r$ 314 and $\delta_t$ 316 can be used to assist sidelink beam management between the TxUE 304 and the RxUE 306.

Figure 4:
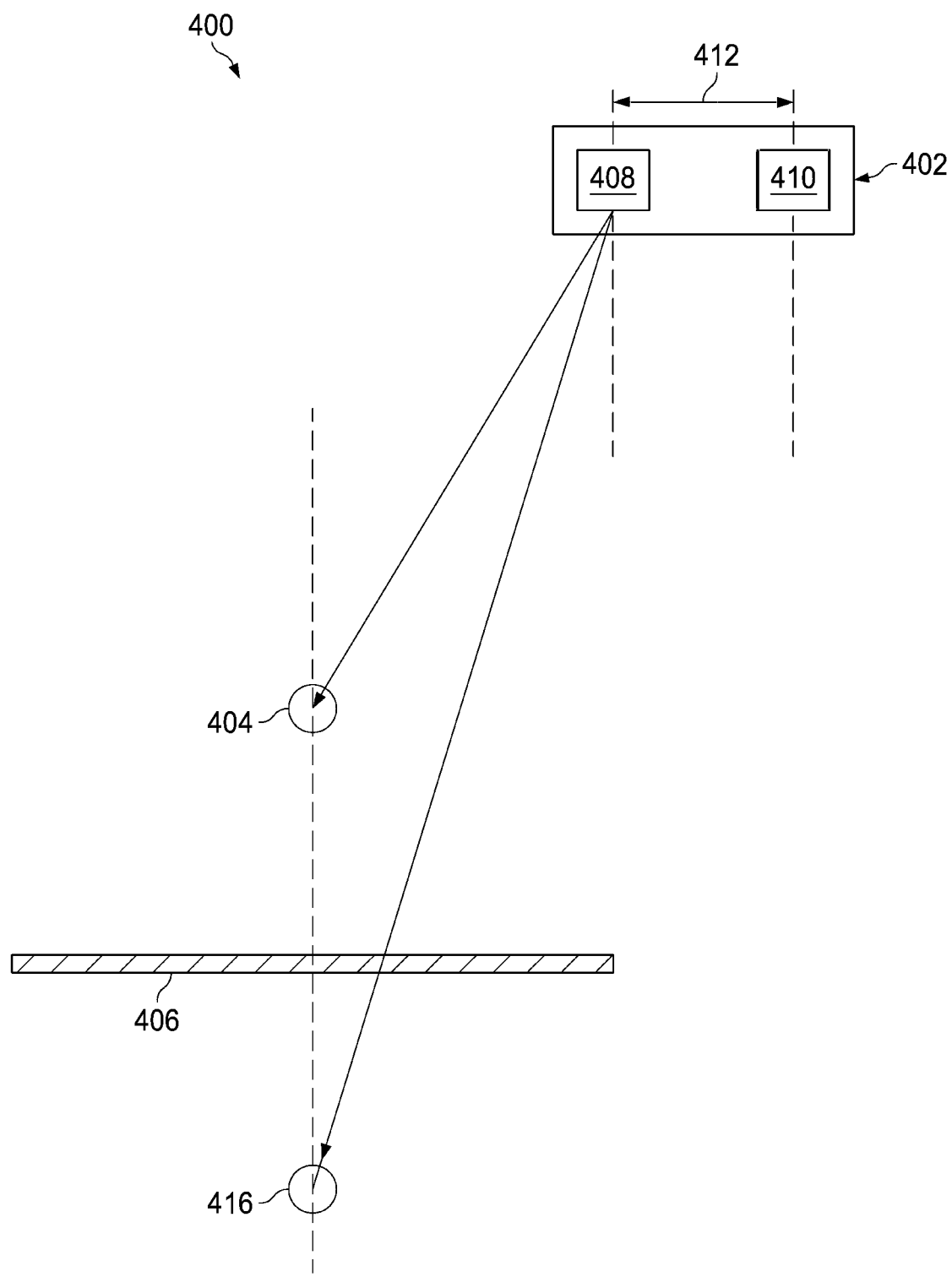
FIG. 4 is a diagram illustrating location estimation with an unknown reflector, according to an implementation.

FIG. 4 is a diagram 400 illustrating location estimation with an unknown reflector, according to an implementation. The diagram 400 includes a base station 402, UE 404, and a reflector 406. The base station 402 includes a first antenna array 408 and a second antenna array 410 that are separated by a distance 412. In some implementations, additional, different, or fewer reflectors can be included in the diagram 400.

In FIGS. 2 and 3, location estimation is based on line of sight (LOS) transmission between TxUE/RxUE and a base station. When there are one or more reflectors (such as flat walls and glasses, that are good reflectors in the mmWave frequency band), there may be one or more estimated locations of TxUE/RxUE. In addition, location estimation may not be as accurate as in the LOS cases.

As illustrated in FIG. 4, the reflector 406 can reflect signals transmitted by the UE 404. For example, the base station 402 can receive signals transmitted by the UE 404 and reflected by the reflector 406. In other words, the UE 404 can have a corresponding mirrored version (UE 416) at the base station 402. As a result, when reference signals transmitted by the UE 404 are received at the base station 402, the base station 402 may have more than one estimated angle of arrival, one by the real UE 404 and the other by the mirrored UE 416. Based on the more than one estimated angle of arrival, the base station 402 can have more than one estimated location of the UE 404.

Figure 5:
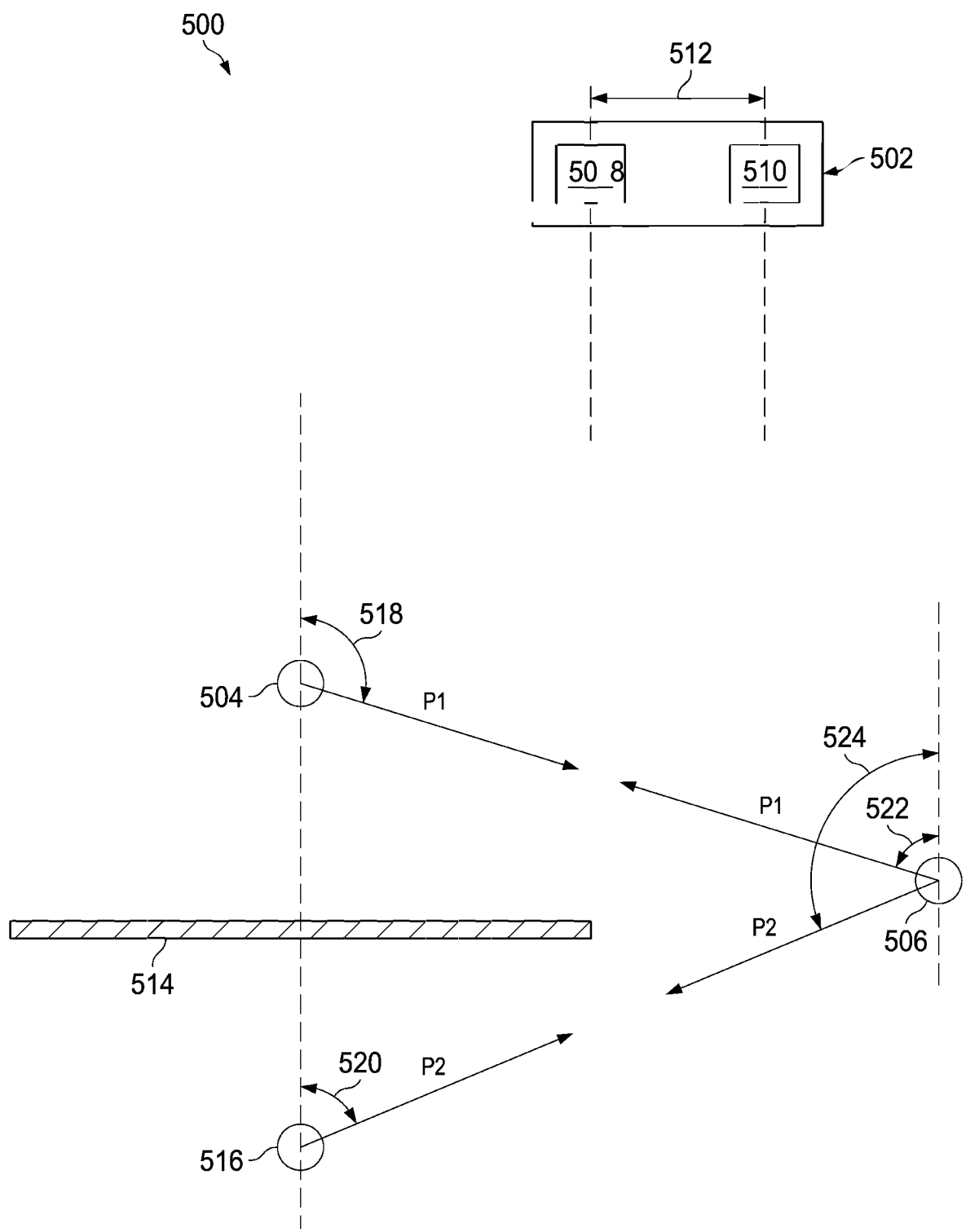
FIG. 5 is a diagram illustrating relative directions estimation between two devices with an unknown reflector, according to an implementation.

FIG. 5 is a diagram 500 illustrating relative directions estimation between two devices with an unknown reflector, according to an implementation. The diagram 500 includes a base station 502, a TxUE 504, an RxUE 506, and a reflector 514. The base station 502 includes a first antenna array 508 and a second antenna array 510 that are separated by a distance 512. In some implementations, additional, different, or fewer reflectors can be included in the diagram 500.

As illustrated in FIG. 5, the reflector 514 can reflect signals transmitted by the TxUE 504. As a result, the base station 502 can have two estimated locations for the TxUE 504, one real location of the TxUE 504 and one mirrored location of a mirrored TxUE 516. Based on an estimated location of the RxUE 506, the base station 502 can estimate Sr 518 (the direction of the RxUE 506 relative to the TxUE 504), $\delta_{r2}$ 520 (the direction of the RxUE 506 relative to the mirrored TxUE 516), $\delta_{t1}$ 522 (the direction of the TxUE 504 relative to the RxUE 506), and $\delta_{t2}$ 524 (the direction of the mirrored TxUE 516 relative to the RxUE 506). In some implementations, the base station 502 can assign a probability to each estimated direction. For example, $\delta_{r1}$ 518 can be assigned with a probability of $p_1$, and $\delta_{r2}$ 520 can be assigned with a probability of $p_2$. $\delta_{t1}$ 522 can be assigned with a probability of $p_1$, and $\delta_{t2}$ 524 can be assigned with a probability of $p_2$. If the base station 502 determines, for example based on the received signal strength, that the TxUE 504 is more likely to be the real TxUE than the mirrored TxUE 516, the base station 502 can set $p_1$ to be greater than $p_2$. In some implementations, the base station can rank $\delta_{r1}$ 518 and $\delta_{r2}$ 520 for the TxUE 504. The base station can rank $\delta_{t1}$ 522 and $\delta_{t2}$ 524 for the RxUE 506. In some implementations, a probability (or a ranking) of an estimated direction can be determined based on at least one of signal path loss or one or more known reflector locations in the environment surrounding the base station. For example, the environment can be a residential home, an office space, a community center, or other structure.

The base station 502 can transmit one or more of $\delta r_1$ 518 and $\delta_{r2}$ 520 to the TxUE 504. In some implementations, the base station 502 can transmit only one of $\delta_{r1}$ 518 and $\delta_{r2}$ 520 that has a greater probability to the TxUE 504. In some implementations, the base station 502 can transmit both $\delta_{r1}$ 518 and $\delta_{r2}$ 520 with their associated probabilities (or ranking information) to the TxUE 504. In some implementations, the base station 502 can sort $\delta_{r1}$ 518 and $\delta_{r2}$ 520 based on their associated probabilities (or ranking information), and put the sorted $\delta_{r1}$ 518 and $\delta_{r2}$ 520 in downlink signaling to the TxUE 504 so that the order in terms of probability can be determined by the TxUE 504. The TxUE 504 can select one of $\delta_{r1}$ 518 and $\delta_{r2}$ 520 for sidelink beam management with the RxUE 506. The base station 502 can transmit one or more of $\delta_{t1}$ 522 and $\delta_{t2}$ 524 to the RxUE 506. In some implementations, the base station 502 can transmit only one of $\delta_{t1}$ 522 and $\delta_{t2}$ 524 that has a greater probability to the RxUE 506. In some implementations, the base station 502 can transmit both $\delta_{t1}$ 522 and $\delta_{t2}$ 524 with their associated probabilities (or ranking information) to the RxUE 506. In some implementations, the base station 502 can sort $\delta_{T1}$ 522 and $\delta_{t2}$ 524 based on their associated probabilities (or ranking information), and put the sorted $\delta_{T1}$ 522 and $\delta_{t2}$ 524 in downlink signaling to the RxUE 506 so that the order in terms of probability can be determined by the RxUE 506. The RxUE 506 can select one of $\delta_{t1}$ 522 and $\delta_{t2}$ 524 for sidelink beam management with the TxUE 504.

In some implementations, the base station 502 can configure uplink time or frequency resources for the TxUE 504 and the RxUE 506 for uplink sounding. The TxUE 504 and the RxUE 506 can then transmit reference signals using assigned time or frequency resources, and the base station 502 can perform measurements and estimate locations of the TxUE 504 and the RxUE 506. The base station 502 can estimate one or more directions of the RxUE 506 located relative to the TxUE 504, and transmit the direction information to the TxUE 504. As a result, the TxUE 504 can use the received direction information to form transmit/receive beams to communicate with the RxUE 506. The base station 502 can estimate one or more directions of the TxUE 504 located relative to the RxUE 506 and transmit the direction information to the RxUE 506. As a result, the RxUE 506 can use the received direction information to form transmit/receive beams to communicate with the TxUE 504.

In some implementations, when transmitting the direction information, a fixed reference direction (e.g., North) can be used. For example, the transmitted direction information can be determined based on the fixed reference direction. In some implementations, LOS direction between TxUE/RxUE and a base station can be used as a reference direction. In such cases, the TxUE/RxUE may require multiple antennas to identify the LOS direction.

In some implementations, a known beam direction between TxUE/RxUE and a base station can be used to transmit the direction information. For example, if a known uplink beam between the TxUE/RxUE and the base station is used as a reference, the base station can transmit an angular information alpha along with an index of the known uplink beam to the TxUE/RxUE. The angular information alpha along with the index of the known uplink beam can indicate that the other UE is at a direction of alpha degrees relative to the known uplink beam direction. In some implementations, the direction information can include clockwise or counterclockwise information for an angular information alpha relative to a reference direction.

In some implementations, signaling between TxUE/RxUE and a base station can use a 3GPP-compliant message (e.g., downlink control information (DCI) using physical downlink control channel (PDCCH), or data packet using physical downlink shared channel (PDSCH)), or a non-3GPP-compliant message (e.g., an upper layer message).

Figure 6:
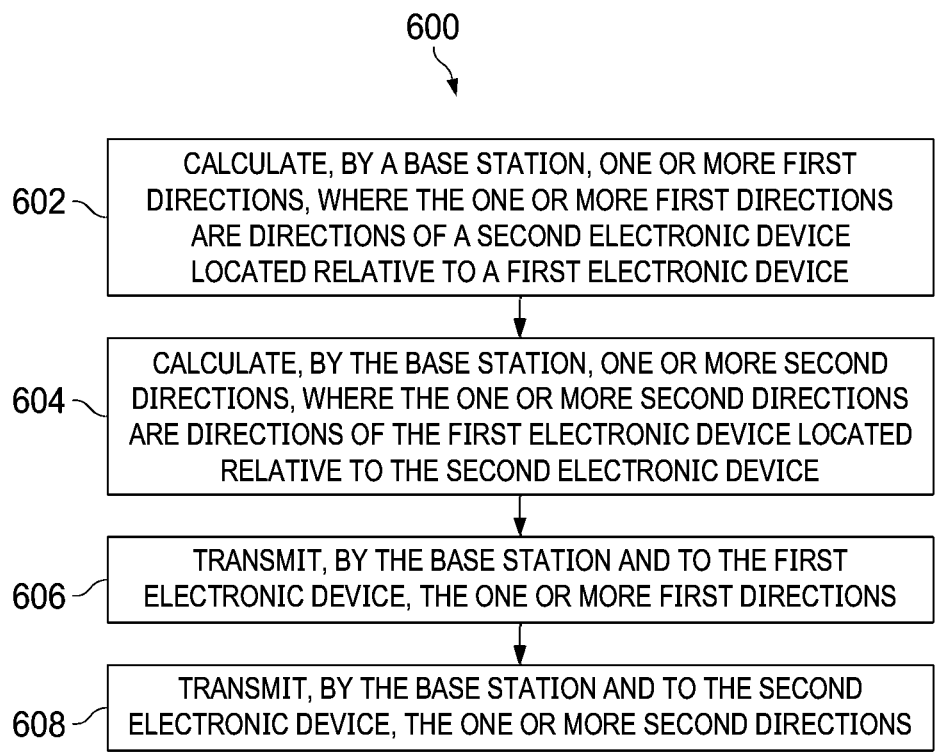
FIG. 6 is a flow diagram illustrating an example method for sidelink beam acquisition with base station assistance, according to an implementation.

FIG. 6 is a flow diagram illustrating an example method 600 for sidelink beam acquisition with base station assistance, according to an implementation. For clarity of presentation, the description that follows generally describes method 600 in the context of the other figures in this description. The method 600 can be implemented by a base station, e.g., the base station 302 illustrated in FIG. 3. However, it will be understood that the method 600 may be performed, for example, by any suitable system, environment, software, and hardware, or a combination of systems, environments, software, and hardware, as appropriate. In some implementations, various steps of the method 600 can be run in parallel, in combination, in loops, or in any order.

The method 600 begins at 602, where a base station calculates one or more first directions. The one or more first directions can be directions of a second electronic device located relative to a first electronic device. For example, the base station can include a smart TV, and the first and second electronic devices can include smart phones with mmWave beamforming capability.

In some implementations, the base station can include a 5G base station (gNB) with multiple antenna arrays. The first electronic device and the second electronic device both can be within coverage of the base station. The first electronic device, the second electronic device, and the multiple antenna arrays can use a same reference direction. In some cases, the first electronic device, the second electronic device, and the multiple antenna arrays can use different reference directions.

At 604, the base station calculates one or more second directions. The one or more second directions can be directions of the first electronic device located relative to the second electronic device. In some implementations, the one or more first directions and the one or more second directions can be calculated based on one or more first estimated locations of the first electronic device and one or more second estimated locations of the second electronic device.

At 606, the base station transmits the one or more first directions to the first electronic device. The one or more first directions can be transmitted with first reference direction information including a fixed reference direction, one or more line of sight (LOS) directions between the first electronic device and the base station, or one or more known beam directions between the first electronic device and the base station.

At 608, the base station transmits the one or more second directions to the second electronic device. The one or more second directions can be transmitted with second reference direction information including the fixed reference direction, one or more LOS directions between the second electronic device and the base station, or one or more known beam directions between the second electronic device and the base station.

In some implementations, when the one or more first directions include two or more first directions, the base station can rank the two or more first directions, and transmit the two or more first directions with ranking information to the first electronic device. When the one or more second directions include two or more second directions, the base station can rank the two or more second directions, and transmit the two or more second directions with ranking information to the second electronic device.

In some implementations, the one or more first directions and the one or more second directions can be used to form transmit beam patterns or receive beam patterns on a sidelink between the first electronic device and the second electronic device.

In some implementations, before 602, the base station can transmit configuration of first uplink resources for first uplink sounding to the first electronic device. The base station can measure the first uplink sounding transmitted by the first electronic device, and calculate, based on the measured first uplink sounding, at least one of one or more first angle of arrivals or one or more first path lengths. The one or more first estimated locations of the first electronic device can be calculated based on at least one of the one or more first angle of arrivals, the one or more first path lengths, or one or more distances between the multiple antenna arrays.

In some implementations, the base station can transmit configuration of second uplink resources for second uplink sounding to the second electronic device. The base station can measure the second uplink sounding transmitted by the second electronic device, and calculate, based on the measured second uplink sounding, at least one of one or more second angle of arrivals or one or more second path lengths. The one or more second estimated locations of the second electronic device can be calculated based on at least one of the one or more second angle of arrivals, the one or more second path lengths, or the one or more distances between the multiple antenna arrays.

FIG. 7 is a block diagram of an example computer system 700 used to provide computational functionalities associated with described algorithms, methods, functions, processes, flows, and procedures, as described in the instant disclosure, according to an implementation. The computer system 700, or more than one computer system 700, can be used to implement the electronic device described previously in this disclosure, e.g., the base station 302 illustrated in FIG. 3.

In some aspects, the computer 702 may comprise a computer that includes an input device, such as a keypad, keyboard, touch screen, or other device that can accept user information, and an output device that conveys information associated with the operation of the computer 702, including digital data, visual, or audio information (or a combination of information), or a graphical user interface (GUI).

The computer 702 can serve in a role as a client, network component, a server, a database or other persistency, or any other component (or a combination of roles) of a computer system for performing the subject matter described in the instant disclosure. The illustrated computer 702 is communicably coupled with a network 730. In some implementations, one or more components of the computer 702 may be configured to operate within environments, including cloud-computing-based, local, global, or other environment (or a combination of environments).

At a high level, the computer 702 is an electronic computing device operable to receive, transmit, process, store, or manage data and information associated with the described subject matter. According to some implementations, the computer 702 may also include, or be communicably coupled with, an application server, e-mail server, web server, caching server, streaming data server, or other server (or a combination of servers).

The computer 702 can receive requests over network 730 from a client application (for example, executing on another computer 702) and respond to the received requests by processing the received requests using an appropriate software application(s). In addition, requests may also be sent to the computer 702 from internal users (for example, from a command console or by other appropriate access methods), external or third-parties, other automated applications, as well as any other appropriate entities, individuals, systems, or computers.

Each of the components of the computer 702 can communicate using a system bus 703. In some implementations, any or all of the components of the computer 702, hardware or software (or a combination of both hardware and software), may interface with each other or the interface 704 (or a combination of both), over the system bus 703 using an application programming interface (API) 712 or a service layer 713 (or a combination of the API 712 and service layer 713). The API 712 may include specifications for routines, data structures, and object classes. The API 712 may be either computer-language independent or dependent and refer to a complete interface, a single function, or even a set of APIs. The service layer 713 provides software services to the computer 702 or other components (whether or not illustrated) that are communicably coupled to the computer 702. The functionality of the computer 702 may be accessible for all service consumers using this service layer. Software services, such as those provided by the service layer 713, provide reusable, defined functionalities through a defined interface. For example, the interface may be software written in JAVA, C++, or other suitable language providing data in extensible markup language (XML) format or other suitable formats. While illustrated as an integrated component of the computer 702, alternative implementations may illustrate the API 712 or the service layer 713 as stand-alone components in relation to other components of the computer 702 or other components (whether or not illustrated) that are communicably coupled to the computer 702. Moreover, any or all parts of the API 712 or the service layer 713 may be implemented as child or sub-modules of another software module, enterprise application, or hardware module without departing from the scope of this disclosure.

The computer 702 includes an interface 704. Although illustrated as a single interface 704 in FIG. 7, two or more interfaces 704 may be used according to particular needs, desires, or particular implementations of the computer 702. The interface 704 is used by the computer 702 for communicating with other systems that are connected to the network 730 (whether illustrated or not) in a distributed environment. Generally, the interface 704 includes logic encoded in software or hardware (or a combination of software and hardware) and is operable to communicate with the network 730. More specifically, the interface 704 may include software supporting one or more communication protocols associated with communication such that the network 730 or interface's hardware is operable to communicate physical signals within and outside of the illustrated computer 702.

The computer 702 includes a processor 705. Although illustrated as a single processor 705 in FIG. 7, two or more processors may be used according to particular needs, desires, or particular implementations of the computer 702. Generally, the processor 705 executes instructions and manipulates data to perform the operations of the computer 702 and any algorithms, methods, functions, processes, flows, and procedures as described in the instant disclosure.

The computer 702 also includes a database 706 that can hold data for the computer 702 or other components (or a combination of both) that can be connected to the network 730 (whether illustrated or not). For example, database 706 can be an in-memory, conventional, or other type of database storing data consistent with this disclosure. In some implementations, database 706 can be a combination of two or more different database types (for example, a hybrid in-memory and conventional database) according to particular needs, desires, or particular implementations of the computer 702 and the described functionality. Although illustrated as a single database 706 in FIG. 7, two or more databases (of the same or combination of types) can be used according to particular needs, desires, or particular implementations of the computer 702 and the described functionality. While database 706 is illustrated as an integral component of the computer 702, in alternative implementations, database 706 can be external to the computer 702.

The computer 702 also includes a memory 707 that can hold data for the computer 702 or other components (or a combination of both) that can be connected to the network 730 (whether illustrated or not). For example, memory 707 can be Random Access Memory (RAM), Read-Only Memory (ROM), optical, magnetic, and the like, storing data consistent with this disclosure. In some implementations, memory 707 can be a combination of two or more different types of memory (for example, a combination of RAM and magnetic storage) according to particular needs, desires, or particular implementations of the computer 702 and the described functionality. Although illustrated as a single memory 707 in FIG. 7, two or more memories 707 (of the same or a combination of types) can be used according to particular needs, desires, or particular implementations of the computer 702 and the described functionality. While memory 707 is illustrated as an integral component of the computer 702, in alternative implementations, memory 707 can be external to the computer 702.

The application 708 is an algorithmic software engine providing functionality according to particular needs, desires, or particular implementations of the computer 702, particularly with respect to functionality described in this disclosure. For example, application 708 can serve as one or more components, modules, or applications. Further, although illustrated as a single application 708, the application 708 may be implemented as multiple applications 708 on the computer 702. In addition, although illustrated as integral to the computer 702, in alternative implementations, the application 708 can be external to the computer 702.

The computer 702 can also include a power supply 714. The power supply 714 can include a rechargeable or non-rechargeable battery that can be configured to be either user- or non-user-replaceable. In some implementations, the power supply 714 can include power-conversion or management circuits (including recharging, standby, or other power management functionality). In some implementations, the power supply 714 can include a power plug to allow the computer 702 to be plugged into a wall socket or other power source to, for example, power the computer 702 or recharge a rechargeable battery.

There may be any number of computers 702 associated with, or external to, a computer system containing computer 702, each computer 702 communicating over network 730. Further, the term "client," "user," and other appropriate terminology may be used interchangeably, as appropriate, without departing from the scope of this disclosure. Moreover, this disclosure contemplates that many users may use one computer 702, or that one user may use multiple computers 702.

FIG. 8 is a schematic diagram illustrating an example structure of a terminal 800 described in the present disclosure, according to an implementation. The terminal 800 includes a receiving circuit 802 and a transmitting circuit 806. In some implementations, terminal 800 can further include one or more circuits for performing any one or a combination of steps described in the present disclosure.

The receiving circuit 802 is configured to receive one or more directions from a base station. The one or more directions can be directions of another terminal located relative to the terminal.

The transmitting circuit 806 is configured to transmit reference signals to the base station.

FIG. 9 is a schematic diagram illustrating an example structure of a base station 900 described in the present disclosure, according to an implementation. The base station 900 includes a receiving circuit 902, an estimation circuit 904, and a transmitting circuit 906. In some implementations, the base station 900 can further include one or more circuits for performing any one or a combination of steps described in the present disclosure.

The receiving circuit 902 is configured to receive reference signals from two or more terminals.

The estimation circuit 904 is configured to estimate locations of the two or more terminals. Based on the estimated locations, relative directions among the two or more terminals can be estimated.

The transmitting circuit 906 is configured to transmit direction information to the two or more terminals.

Described implementations of the subject matter can include one or more features, alone or in combination.

In a first implementation, a method includes: calculating, by a base station, one or more first directions, where the one or more first directions are directions of a second electronic device located relative to a first electronic device; calculating, by the base station, one or more second directions, where the one or more second directions are directions of the first electronic device located relative to the second electronic device; transmitting, by the base station and to the first electronic device, the one or more first directions; and transmitting, by the base station and to the second electronic device, the one or more second directions.

The foregoing and other described implementations can each, optionally, include one or more of the following features:

A first feature, combinable with any of the following features, where: the one or more first directions and the one or more second directions are calculated based on one or more first estimated locations of the first electronic device and one or more second estimated locations of the second electronic device; and the one or more first directions and the one or more second directions are used to form transmit beam patterns or receive beam patterns on a sidelink between the first electronic device and the second electronic device.

A second feature, combinable with any of the previous or following features, where the base station includes a 5G base station (gNB) with a plurality of antenna arrays, the first electronic device and the second electronic device are within coverage of the base station, and the first electronic device, the second electronic device, and the plurality of antenna arrays use a same reference direction.

A third feature, combinable with any of the previous or following features, the method further comprising: transmitting, by the base station and to the first electronic device, configuration of first uplink resources for first uplink sounding; measuring, by the base station, the first uplink sounding transmitted by the first electronic device; calculating, by the base station and based on the measured first uplink sounding, one or more first angle of arrivals, where the one or more first estimated locations of the first electronic device are calculated based on at least one of the one or more first angle of arrivals and one or more distances between the plurality of antenna arrays.

A fourth feature, combinable with any of the previous or following features, the method further comprising: calculating, by the base station and based on the measured first uplink sounding, one or more first path lengths, where the one or more first estimated locations of the first electronic device are calculated based on at least one of the one or more first angle of arrivals, the one or more first path lengths, and the one or more distances between the plurality of antenna arrays.

A fifth feature, combinable with any of the previous or following features, the method further comprising: when the one or more first directions include two or more first directions: ranking, by the base station, the two or more first directions; and transmitting, by the base station and to the first electronic device, the two or more first directions with ranking information.

A sixth feature, combinable with any of the previous or following features, where: the one or more first directions are transmitted with first reference direction information including a fixed reference direction, one or more line of sight (LOS) directions between the first electronic device and the base station, or one or more known beam directions between the first electronic device and the base station.

A seventh feature, combinable with any of the previous or following features, where the base station includes a smart TV, and the first and second electronic devices include smart phones with mmWave beamforming capability.

In a second implementation, an electronic device includes: a non-transitory memory storage comprising instructions; and one or more hardware processors in communication with the memory storage, where the one or more hardware processors execute the instructions to perform operations comprising: calculating one or more first directions, where the one or more first directions are directions of a second electronic device located relative to a first electronic device; calculating one or more second directions, where the one or more second directions are directions of the first electronic device located relative to the second electronic device; transmitting, to the first electronic device, the one or more first directions; and transmitting, to the second electronic device, the one or more second directions.

The foregoing and other described implementations can each, optionally, include one or more of the following features:

A first feature, combinable with any of the following features, where: the one or more first directions and the one or more second directions are calculated based on one or more first estimated locations of the first electronic device and one or more second estimated locations of the second electronic device; and the one or more first directions and the one or more second directions are used to form transmit beam patterns or receive beam patterns on a sidelink between the first electronic device and the second electronic device.

A second feature, combinable with any of the previous or following features, where the electronic device includes a 5G base station (gNB) with a plurality of antenna arrays, the first electronic device and the second electronic device are within coverage of the gNB, and the first electronic device, the second electronic device, and the plurality of antenna arrays use a same reference direction.

A third feature, combinable with any of the previous or following features, the operations further comprising: transmitting, to the first electronic device, configuration of first uplink resources for first uplink sounding; measuring the first uplink sounding transmitted by the first electronic device; calculating, based on the measured first uplink sounding, one or more first angle of arrivals, where the one or more first estimated locations of the first electronic device are calculated based on at least one of the one or more first angle of arrivals and one or more distances between the plurality of antenna arrays.

A fourth feature, combinable with any of the previous or following features, the operations further comprising: calculating, based on the measured first uplink sounding, one or more first path lengths, where the one or more first estimated locations of the first electronic device are calculated based on at least one of the one or more first angle of arrivals, the one or more first path lengths, and the one or more distances between the plurality of antenna arrays.

A fifth feature, combinable with any of the previous or following features, the operations further comprising: when the one or more first directions includes two or more first directions: ranking the two or more first directions; and transmitting, to the first electronic device, the two or more first directions with ranking information.

A sixth feature, combinable with any of the previous or following features, where: the one or more first directions are transmitted with first reference direction information including a fixed reference direction, one or more line of sight (LOS) directions between the first electronic device and the electronic device, or one or more known beam directions between the first electronic device and the electronic device.

A seventh feature, combinable with any of the previous or following features, where the electronic device includes a smart TV, and the first and second electronic devices include smart phones with mmWave beamforming capability.

In a third implementation, a non-transitory computer-readable medium storing computer instructions for transmission beam control in a data communication, that when executed by one or more hardware processors, cause the one or more hardware processors to perform operations comprising: calculating, by a base station, one or more first directions, where the one or more first directions are directions of a second electronic device located relative to a first electronic device; calculating, by the base station, one or more second directions, where the one or more second directions are directions of the first electronic device located relative to the second electronic device; transmitting, by the base station and to the first electronic device, the one or more first directions; and transmitting, by the base station and to the second electronic device, the one or more second directions.

The foregoing and other described implementations can each, optionally, include one or more of the following features:

A first feature, combinable with any of the following features, where: the one or more first directions and the one or more second directions are calculated based on one or more first estimated locations of the first electronic device and one or more second estimated locations of the second electronic device; and the one or more first directions and the one or more second directions are used to form transmit beam patterns or receive beam patterns on a sidelink between the first electronic device and the second electronic device.

A second feature, combinable with any of the previous or following features, where the base station includes a 5G base station (gNB) with a plurality of antenna arrays, the first electronic device and the second electronic device are within coverage of the base station, and the first electronic device, the second electronic device, and the plurality of antenna arrays use a same reference direction.

A third feature, combinable with any of the previous or following features, the operations further comprising: transmitting, by the base station and to the first electronic device, configuration of first uplink resources for first uplink sounding; measuring, by the base station, the first uplink sounding transmitted by the first electronic device; calculating, by the base station and based on the measured first uplink sounding, one or more first angle of arrivals, where the one or more first estimated locations of the first electronic device are calculated based on at least one of the one or more first angle of arrivals and one or more distances between the plurality of antenna arrays.

A fourth feature, combinable with any of the previous or following features, the operations further comprising: calculating, by the base station and based on the measured first uplink sounding, one or more first path lengths, where the one or more first estimated locations of the first electronic device are calculated based on at least one of the one or more first angle of arrivals, the one or more first path lengths, and the one or more distances between the plurality of antenna arrays.

A fifth feature, combinable with any of the previous or following features, the operations further comprising: when the one or more first directions includes two or more first directions: ranking, by the base station, the two or more first directions; and transmitting, by the base station and to the first electronic device, the two or more first directions with ranking information.

A sixth feature, combinable with any of the previous or following features, where: the one or more first directions are transmitted with first reference direction information including a fixed reference direction, one or more line of sight (LOS) directions between the first electronic device and the base station, or one or more known beam directions between the first electronic device and the base station.

A seventh feature, combinable with any of the previous or following features, where the base station includes a smart TV, and the first and second electronic devices include smart phones with mmWave beamforming capability.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RIFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including byway of example, a programmable processor, a computer, or multiple processors or computers. The apparatus can also be or further include special purpose logic circuitry, for example, a Central Processing Unit (CPU), a Field Programmable Gate Array (FPGA), or an Application-specific Integrated Circuit (ASIC). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a ROM or a Random Access Memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a Personal Digital Assistant (PDA), a mobile audio or video player, a game console, a Global Positioning System (GPS) receiver, or a portable storage device, for example, a Universal Serial Bus (USB) flash drive, to name just a few.

Computer-readable media (transitory or non-transitory, as appropriate) suitable for storing computer program instructions and data includes non-volatile memory, media and memory devices, including by way of example, semiconductor memory devices, for example, Erasable Programmable Read-Only Memory (EPROM), Electrically Erasable Programmable Read-Only Memory (EEPROM), and flash memory devices; magnetic disks, for example, internal hard disks or removable disks; magneto-optical disks; and CD-ROM, DVD+/–R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a Cathode Ray Tube (CRT), Liquid Crystal Display (LCD), Light Emitting Diode (LED), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a Command Line Interface (CLI) that processes information and efficiently presents the information results to the user. In general, a GUI may include a plurality of User Interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a Local Area Network (LAN), a Radio Access Network (RAN), a Metropolitan Area Network (MAN), a Wide Area Network (WAN), Worldwide Interoperability for Microwave Access (WIMAX), a Wireless Local Area Network (WLAN) using, for example, 802.11 a/b/g/n or 802.20 (or a combination of 802.1ix and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination or in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a method; a non-transitory, computer-readable medium storing computer-readable instructions to perform the method; and a computer system comprising a computer memory interoperably coupled with a hardware processor configured to perform the method or the instructions stored on the non-transitory, computer-readable medium.

What is claimed is:

1. A method, comprising:
    calculating, by a base station, one or more first directions, wherein the one or more first directions are directions of a second electronic device located relative to a first electronic device;
    calculating, by the base station, one or more second directions, wherein the one or more second directions are directions of the first electronic device located relative to the second electronic device;
    transmitting, by the base station and to the first electronic device, the one or more first directions; and
    transmitting, by the base station and to the second electronic device, the one or more second directions.

2. The method according to claim 1,
    wherein the one or more first directions and the one or more second directions are calculated based on one or more first estimated locations of the first electronic device and one or more second estimated locations of the second electronic device, and
    wherein the one or more first directions and the one or more second directions are used to form transmit beam patterns or receive beam patterns on a sidelink between the first electronic device and the second electronic device.

3. The method according to claim 2, wherein the base station includes a 5G base station (gNB) with a plurality of antenna arrays, wherein the first electronic device and the second electronic device are within coverage of the base station, and wherein the first electronic device, the second electronic device, and the plurality of antenna arrays use a same reference direction.

4. The method according to claim 3, the method further comprising:
    transmitting, by the base station and to the first electronic device, configuration of first uplink resources for first uplink sounding;
    measuring, by the base station, the first uplink sounding transmitted by the first electronic device; and
    calculating, by the base station and based on the first uplink sounding, one or more first angle of arrivals, wherein the one or more first estimated locations of the first electronic device are calculated based on at least one of the one or more first angle of arrivals and one or more distances between the plurality of antenna arrays.

5. The method according to claim 4, the method further comprising:
    calculating, by the base station and based on the first uplink sounding, one or more first path lengths, wherein the one or more first estimated locations of the first electronic device are calculated based on at least one of the one or more first angle of arrivals, the one or more first path lengths, and the one or more distances between the plurality of antenna arrays.

6. The method according to claim 1, the method further comprising:
    when the one or more first directions include two or more first directions:
        ranking, by the base station, the two or more first directions; and
        transmitting, by the base station and to the first electronic device, the two or more first directions with ranking information.

7. The method according to claim 1, wherein the one or more first directions are transmitted with first reference direction information including a fixed reference direction, one or more line of sight (LOS) directions between the first electronic device and the base station, or one or more known beam directions between the first electronic device and the base station.

8. The method according to claim 1, wherein the base station includes a smart TV, and wherein the first and second electronic devices include smart phones with millimeter wave (mmWave) beamforming capability.

9. An base station, comprising:
    a non-transitory memory storage comprising instructions; and
    one or more hardware processors in communication with the non-transitory memory storage, wherein the one or more hardware processors execute the instructions to cause the base station to perform operations comprising:
        calculating one or more first directions, wherein the one or more first directions are directions of a second electronic device located relative to a first electronic device;
        calculating one or more second directions, wherein the one or more second directions are directions of the first electronic device located relative to the second electronic device;
        transmitting, to the first electronic device, the one or more first directions; and
        transmitting, to the second electronic device, the one or more second directions.

10. The base station according to claim 9,
    wherein the one or more first directions and the one or more second directions are calculated based on one or more first estimated locations of the first electronic device and one or more second estimated locations of the second electronic device, and wherein the one or more first directions and the one or more second directions are used to form transmit beam patterns or receive beam patterns on a sidelink between the first electronic device and the second electronic device.

11. The base station according to claim 10, wherein base station includes a 5G base station (gNB) with a plurality of antenna arrays, wherein the first electronic device and the second electronic device are within coverage of the base station, and wherein the first electronic device, the second electronic device, and the plurality of antenna arrays use a same reference direction.

12. The base station according to claim 11, the operations further comprising:
transmitting, to the first electronic device, configuration of first uplink resources for first uplink sounding;
measuring the first uplink sounding transmitted by the first electronic device; and
calculating, based on the first uplink sounding, one or more first angle of arrivals, wherein the one or more first estimated locations of the first electronic device are calculated based on at least one of the one or more first angle of arrivals and one or more distances between the plurality of antenna arrays.

13. The base station according to claim 12, the operations further comprising:
calculating, based on the first uplink sounding, one or more first path lengths, wherein the one or more first estimated locations of the first electronic device are calculated based on at least one of the one or more first angle of arrivals, the one or more first path lengths, and the one or more distances between the plurality of antenna arrays.

14. The base station according to claim 9, the operations further comprising:
when the one or more first directions include two or more first directions:
ranking the two or more first directions; and
transmitting, to the first electronic device, the two or more first directions with ranking information.

15. The base station according to claim 9,
wherein the one or more first directions are transmitted with first reference direction information including a fixed reference direction, one or more line of sight (LOS) directions between the first electronic device and the base station, or one or more known beam directions between the first electronic device and the base station.

16. The base station according to claim 9, wherein the base station includes a smart TV, and wherein the first and second electronic devices include smart phones with millimeter wave (mmWave) beamforming capability.

17. A non-transitory computer-readable medium storing computer instructions, that when executed by a base station, cause the base station to perform operations comprising:
calculating one or more first directions, wherein the one or more first directions are directions of a second electronic device located relative to a first electronic device;
calculating one or more second directions, wherein the one or more second directions are directions of the first electronic device located relative to the second electronic device;
transmitting, and to the first electronic device, the one or more first directions; and
transmitting, to the second electronic device, the one or more second directions.

18. The non-transitory computer-readable medium according to claim 17,
wherein the one or more first directions and the one or more second directions are calculated based on one or more first estimated locations of the first electronic device and one or more second estimated locations of the second electronic device, and
wherein the one or more first directions and the one or more second directions are used to form transmit beam patterns or receive beam patterns on a sidelink between the first electronic device and the second electronic device.

19. The non-transitory computer-readable medium according to claim 18, wherein the base station includes a 5G base station (gNB) with a plurality of antenna arrays, wherein the first electronic device and the second electronic device are within coverage of the base station, and the first electronic device, the second electronic device, and the plurality of antenna arrays use a same reference direction.

20. The non-transitory computer-readable medium according to claim 19, the operations further comprising:
transmitting, to the first electronic device, configuration of first uplink resources for first uplink sounding;
measuring the first uplink sounding transmitted by the first electronic device; and
calculating, based on the first uplink sounding, one or more first angle of arrivals, wherein the one or more first estimated locations of the first electronic device are calculated based on at least one of the one or more first angle of arrivals and one or more distances between the plurality of antenna arrays.

21. The non-transitory computer-readable medium according to claim 20, the operations further comprising:
calculating, based on the first uplink sounding, one or more first path lengths, wherein the one or more first estimated locations of the first electronic device are calculated based on at least one of the one or more first angle of arrivals, the one or more first path lengths, and wherein the one or more distances between the plurality of antenna arrays.

22. The non-transitory computer-readable medium according to claim 17, the operations further comprising:
when the one or more first directions include two or more first directions:
ranking the two or more first directions; and
transmitting, to the first electronic device, the two or more first directions with ranking information.

23. The non-transitory computer-readable medium according to claim 17, wherein the one or more first directions are transmitted with first reference direction information including a fixed reference direction, one or more line of sight (LOS) directions between the first electronic device and the base station, or one or more known beam directions between the first electronic device and the base station.

24. The non-transitory computer-readable medium according to claim 17, wherein the base station includes a smart TV, and the first and second electronic devices include smart phones with millimeter wave (mmWave) beamforming capability.

* * * * *